United States Patent [19]

Fujiki et al.

[11] Patent Number: 4,501,800
[45] Date of Patent: Feb. 26, 1985

[54] MAGNETIC RECORDING MEDIA COMPRISING ORGANOSILICONES IN A MAGNETIC LAYER THEREOF

[75] Inventors: Kuniharu Fujiki, Mito; Shigeru Hashimoto, Tokyo, both of Japan

[73] Assignee: Victor Company of Japan, Limited, Japan

[21] Appl. No.: 517,714

[22] Filed: Jul. 27, 1983

[30] Foreign Application Priority Data

Jul. 29, 1982 [JP] Japan .................. 57-131153

[51] Int. Cl.$^3$ .................. G11B 5/68; G11B 5/70; G11B 5/72
[52] U.S. Cl. .................. 428/447; 252/62.54; 360/134; 360/135; 360/136; 427/128; 428/694; 428/695; 428/900
[58] Field of Search .............. 428/447, 695, 694, 900; 360/134-136; 252/62.54; 427/128

[56] References Cited

U.S. PATENT DOCUMENTS

| | | | |
|---|---|---|---|
| 4,110,503 | 8/1978 | Ogawa | 428/447 |
| 4,135,016 | 1/1979 | Ogawa | 428/447 |
| 4,171,406 | 10/1979 | Yamaguchi | 428/447 |
| 4,349,608 | 9/1982 | Shimizu | 428/447 |

FOREIGN PATENT DOCUMENTS

| | | | |
|---|---|---|---|
| 52-70811 | 6/1977 | Japan. | |
| 52-108804 | 9/1977 | Japan. | |
| 0080827 | 7/1981 | Japan | 428/447 |
| 57-12414 | 1/1982 | Japan. | |
| 57-12420 | 1/1982 | Japan. | |

*Primary Examiner*—Ellis P. Robinson
*Attorney, Agent, or Firm*—Lowe, King, Price & Becker

[57] ABSTRACT

Magnetic recording media are described which comprise a support having a magnetic recording layer thereon. The magnetic recording layer is made of a dispersion of magnetic particles in a binder and a specific type of organosilicone. The organosilicone is represented by the general formula

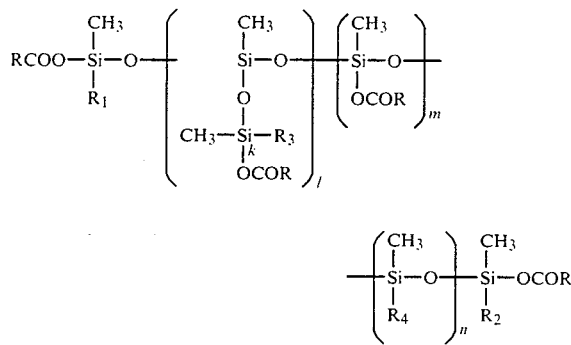

in which R represents a monovalent saturated or unsaturated hydrocarbon having 7 to 21 carbon atoms, $R_1$, $R_2$ and $R_3$ independently represent a methyl or RCOO group, $R_4$ is a saturated hydrocarbon group having 1 to 20 carbon atoms, and k, l, m and n are independently an integer provided that $1 < K$, $1 \leq l < 200$, $1 \leq m < 200$, $0 \leq n < 300$, and $l + m + n \leq 500$.

5 Claims, 1 Drawing Figure

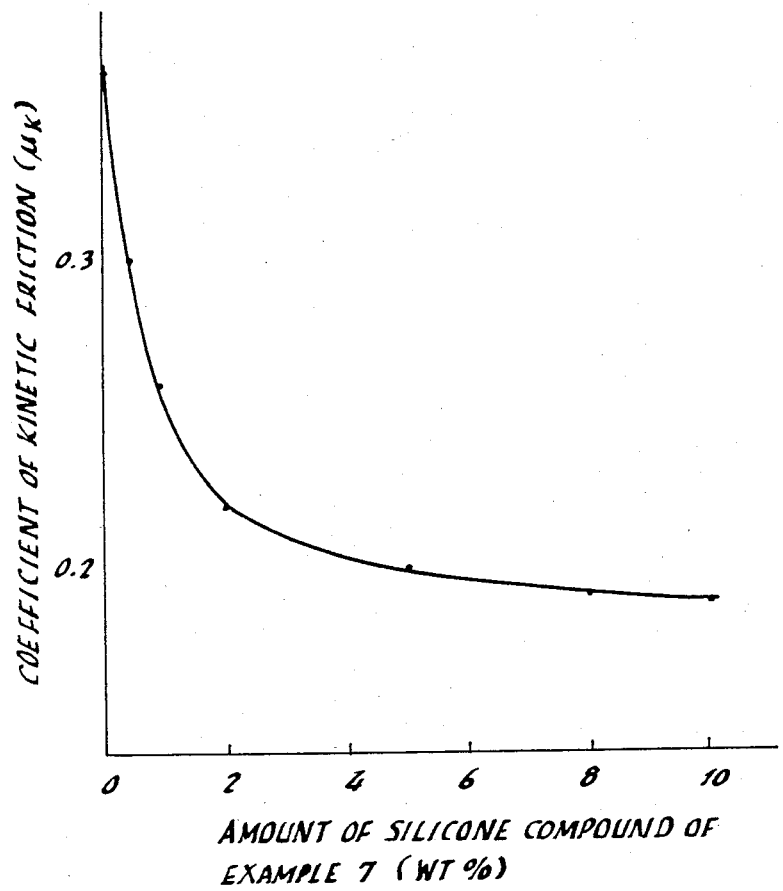

MAGNETIC RECORDING MEDIA COMPRISING ORGANOSILICONES IN A MAGNETIC LAYER THEREOF

BACKGROUND OF THE INVENTION

1. Field of the Invention

This invention relates to the magnetic recording art and more particularly, to magnetic recording media comprising a specific type of organosilicone compound as a lubricant.

2. Description of the Prior Art

Home video tape recorders have recently become popular, and portable types of small-size video tape recorders are now increasing in number. Video tape recorders of the type having a built-in video camera therein have been developed and are now commercially sold. These video tape recorders require improvements of magnetic recording media not only in recording density, but also in surface smoothness and travelling performance. This is because recording and reproducing systems for use in these video tape recorders are the so-called helical capstan systems using rotary magnetic heads and are provided with a mechanism for reproducing a still reproduction picture. Magnetic recording media such as a magnetic tape, which are used in the above type of recording and reproducing apparatus, are travelled while contacting the magnetic heads, guide pins, and the like. Hence, the magnetic layer of the recording medium should have a low coefficient of friction to ensure a stable travelling performance. Additionally, because the magnetic layer tightly contacts the rotary magnetic heads at the time of recording and reproducing operations, it is required to have good abrasion resistance. With small-size, portable video tape recorders, they are frequently used under severe outdoor conditions which involve either high temperature and high humidity conditions, or low temperature conditions. Even under these conditions, magnetic recording tapes have to be stably travelled.

In order to improve the characteristics such that the magnetic layer of magnetic recording media has a small coefficient of kinetic friction, a stable travelling performance, and a good abrasion resistance, there has been proposed use of a number of lubricants. For instance, there are added to a magnetic layer silicone oils such as dimethyl silicone, and fatty acid-modified organosilicone compounds of the following general formulas (I) (Japanese Laid-open Application No. 52-70811), (II) (Japanese Japanese Laid-open Application No. 57-12414), (III) (Japanese Laid-open Application No. 52-108804), and (IV) (Japanese Laid-open Application No. 57-12420).

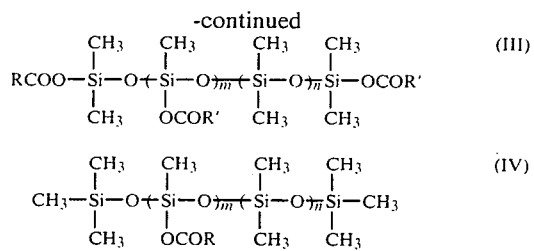

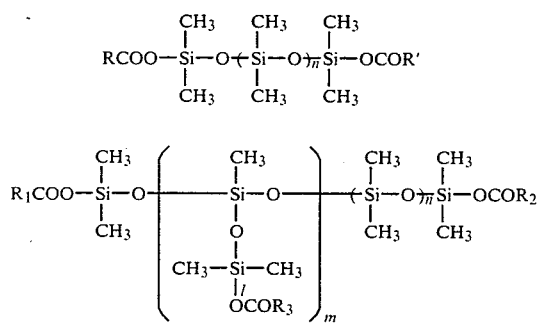

However, silicone oils such as dimethyl silicone are not favorable. Although excellent in lubricating property, they have poor miscibility with binders in the magnetic layer and are apt to exude on the surface of the magnetic layer, thus causing the surface to become sticky and lowering electromagnetic conversion characteristics such as as S/N ratio.

The fatty acid-modified organosilicone compounds of the general formulas (I) through (IV) have, respectively, the following defects. The compounds of the general formula (I) have a good lubricating property and the compounds of the general formula (II) are stable and do not decompose even under high temperature and high humidity conditions. However, the compounds of the formulas (I) and (II) are not satisfactory in compatibility with binders and a magnetic layer containing the compounds is poor in durability when travelled over a long term. The compounds of the general formulas (III) and (IV) are more compatible with binders than the compounds of the formulas (I) and (II). However, the compounds of the formula (III) are disadvantageous in that they are poor in stability, cause a magnetic paint to gel, or adversely affect the dispersion of a magnetic paint. In addition, when a magnetic recording tape using a compound of the formula (III) is used for recording and reproducing purposes under high temperature and high humidity conditions, a stable travelling operation is not ensured. The compounds of the general formula (IV) do not show good lubricating and durability properties.

SUMMARY OF THE INVENTION

It is an object of the present invention to provide magnetic recording media which comprise a specific type of organosilicone compound in a magnetic layer by which the good travelling performance of the media are ensured even under high temperature and high humidity conditions or under low temperature conditions.

It is another object of the invention to provide recording media using a specific type of organosilicone compound which has good compatibility with various binders and are chemically stable without decomposition even under high temperature and high humidity conditions.

It is a further object of the invention to provide magnetic recording media whose magnetic layer has a low coefficient of kinetic friction and is thus excellent in abrasion resistance.

It is another object of the invention to provide magnetic recording media which do not cause magnetic heads of a recording and reproducing apparatus to stain when travelled over a long term.

The above objects can be achieved, according to the present invention, by a magnetic recording medium which comprises a support having thereon a recording magnetic layer which comprises a dispersion of magnetic particles in a mixture of a binder and a lubricant, the lubricant being an organosilicone compound of the following general formula (A)

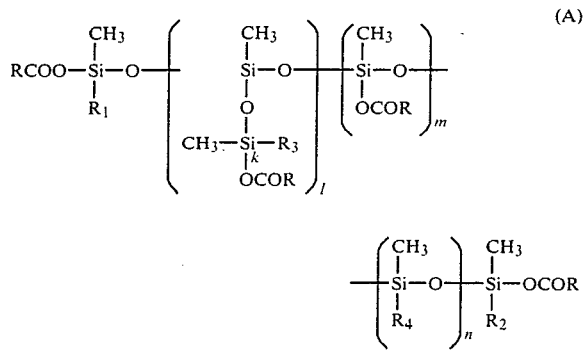

in which each R represents a monovalent saturated or unsaturated hydrocarbon group having from 7 to 21 carbon atoms, $R_1$, $R_2$ and $R_3$ independently represent a methyl or RCOO group wherein R has the same meaning as defined above, $R_4$ represents a monovalent saturated hydrocarbon group having from 1 to 20 carbon atoms, and k, l, m and n are independently an integer provided that $1 \leq k$, $1 \leq l < 200$, $1 \leq m < 200$, $0 \leq n < 300$, and $1+m+n \leq 500$.

DETAILED DESCRIPTION AND PREFERRED EMBODIMENTS OF THE INVENTION

The present invention is characterized by the presence of the organosilicone compounds represented by the above formula (A) in the magnetic layer of magnetic recording media. As will be seen from the formula, the organosilicone compounds have, in the molecule thereof, fatty acid groups which allow good compatibility with a binder. In the formula, each R is defined as a monovalent saturated or unsaturated hydrocarbon group having from 7 to 21 carbon atoms. Specific examples of the RCOO groups include saturated fatty acid residues such as capryl, decyl, lauryl, myristyl, palmityl, stearyl, behenyl, and the like, and unsaturated fatty acid residues such as zoomaryl, oleyl, linoleyl, linolenyl, gadoleyl, and the like. The compounds of the formula (A) in which each R has the meaning as defined above exhibit excellent lubricating and durability properties even under high or low temperature conditions when incorporated in the magnetic layer of a magnetic recording medium. If, however, the number of carbon atoms of each R is below 6, inclusive, the lubricating property becomes unsatisfactory and the durability of the magnetic layer also becomes poor. On the contrary, the organosilicone compounds of the formula (A), in which each R is a hydrocarbon group having over 22 carbon atoms, have poor compatibility with resin binders and are poor in lubricating property at low temperatures.

$R_1$, $R_2$, $R_3$, and $R_4$ in the formula (A) do not affect on the characteristic properties of the recording media of the invention so much as compared with the R radicals.

As defined before, k, l, m, and n are independently an integer on the condition that $1 \leq k$, $1 \leq l < 200$, $1 \leq m < 200$, $0 \leq n < 300$, and $1+m+n \leq 500$. Preferably, the following requirements should be satisfied: $1 \leq l < 100$, $0 \leq n < 200$, $1 \leq m < 100$, $1+m+n \leq 300$, $1 > K < 1+m+n$, and $0.1 < (l+m)/n$. When l, m, and n are too large in number or when $k > 1+m+n$, the molecular weight of the organosilicone compound of the general formula (A) becomes too large. This leads to poor compatibility with a binder, poor dispersability of a magnetic paint, reduced smoothness of the surface of a magnetic layer, and lowering of electromagnetic conversion characteristics. Organosilicone compounds of the formula (A) in which k=0 are poor in stability and deteriorates in durability under high temperature and high humidity conditions when applied to a magnetic layer. Further, the compounds of the formula (A) in which m is zero have poor compatibility with a binder. A magnetic layer to which the above compounds outside the range of the invention are added deteriorates in durability when travelled over a long term. The compounds of the formula (A) in which $(1+m)/n < 0.1$ are rather disadvantageous in that recording media using such compounds are relatively poor in lubricating property, durability, and dispersability of magnetic particles though they may be used.

The most preferable organosilicone compound of the invention is a compound of the formula (A) in which each R represents $C_7H_{15}$, $R_1$, $R_2$ and $R_3$ independently represent $CH_3$, $R_4$ represents $C_{10}H_{21}$, $k=l=m=2$, and $n=10$ as particularly described in Example 1.

The organosilicone compounds of the present invention are generally used in an amount of 0.5 to 10 wt%, preferably 1 to 6 wt%, of magnetic particles. Amounts larger than 10 wt% result in a smaller coefficient of kinetic friction, but bring about so high a plasticizing effect on the magnetic layer that the durability of the layer lowers at the time of still reproduction. Smaller amounts result in a smaller effect of the addition.

The oranosilicone compounds of the formula (A) according to the invention can be prepared, for example, by the reaction between organosilicone compounds of the following general formula

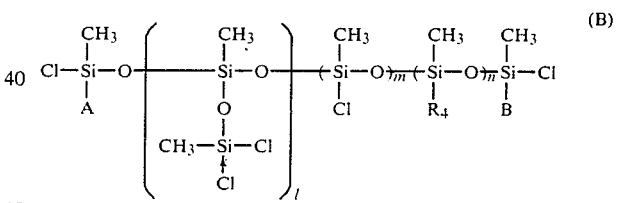

in which A, B and C are independently a methyl group or Cl, and $R_4$, k, l, m, and n have the same meanings as defined with regard to the formula (A), and a fatty acid represented by the formula, RCOOH, in which R has the same meaning as defined before. By the reaction, hydrochloric acid is formed and eliminated. The reaction is effected at a temperature of from 0° to 150° C. in the presence of a tertiary amine, serving as an acid binding agent, such as triethylamine, pyridine, picoline, and the like, in a solvent. The solvents include, for example, aromatic hydrocarbons such as benzene, toluene, and the like, saturated hydrocarbons such as n-pentane, n-hexane, cyclohexane, and the like, ethers such as diethyl ether, and chlorinated hydrocarbons such as methylene chloride, chloroform, and the like.

In the practice of the present invention, any known binders and magnetic materials are used. Examples of the magnetic materials include ferromagnetic iron oxide materials such as gamma-$Fe_2O_3$ and $Fe_3O_4$ with or without additional metals such as Co, Ni, Mn, and the like, ferromagnetic metals such as Fe, Co, Ni, and alloys thereof such as Fe-Co, F-Ni, Co-Ni, and Fe-Co-Ni with or without other metals such as Al, Cr, Mn, Cu, Zn, and the like.

Useful binders are any known thermoplastic resins, thermosetting resins, and mixtures thereof. Typical of the thermoplastic resins are vinyl chloride-vinyl acetate copolymers, vinyl chloride-vinylidene chloride copolymers, acrylic ester-styrene copolymers, methacrylic ester-styrene copolymers, acrylic ester-vinylidene chloride copolymers, methacrylic ester-vinylidene chloride copolymers, urethane elastomers, cellulose derivatives, vinyl chloride-vinyl acetate-vinyl alcohol terpolymers, and various other synthetic resins. Examples of the thermosetting resins include phenolic resins, melamine resins, alkyd resins, silicone resins, urea-formaldehyde resins, mixtures of isocyanates and polyols, and the like. These binder resins may be used singly or in combination. Typical solvents for these binders are aromatic compounds such as xylene, toluene, benzene, and the like, ketones such as methyl ethyl ketone, methyl isobutyl ketone, and the like, and mixtures thereof. Broadly, magnetic particles are used in an amount of 200 to 800 parts by weight per 100 parts by weight of a binder, which may, more or less, vary depending on the type of recording medium. The organosilicone compounds of the present invention are used, as indicated before, in an amount of from 0.5 to 10 wt% based on the weight of the magnetic particles used.

In fabricating the magnetic recording medium of the present invention, binder resins, magnetic particles, and the organosilicone compound of the formula (A) are mixed in predetermined ratios in a solvent and kneaded in a suitable kneading machine such as a three roll mixer, ball mill, sand grinder, kneader, or the like. The resulting magnetic paint is passed through a filter to remove foreign matters therefrom and applied to a base, followed by drying, calendering and curing as usual, thereby obtaining a magnetic recording medium. The base may be in the form of films, foils, or sheets made of a variety of materials such as synthetic or semi-synthetic resins, metals, and glasses or ceramics. As a matter of course, known additives may be added at the stage of the kneading, including dispersing agents, other lubricants, abrasive agents, anti-static agents, and the like.

The recording media of the invention are not limited only to video tapes, but include audio tapes, magnetic cards, magnetic discs, and the like.

The present invention is described in more detail by way of example.

EXAMPLE 1

100 parts by weight of Co-gamma-$Fe_2O_3$, 10 parts by weight of vinyl chloride-vinyl acetate-vinyl alcohol terpolymer (VAGH, trade name of Union Carbide Corp. of U.S.A.), 10 parts by weight of polyurethane elastomer (Pandex T-5260, made by Dainippon Ink Co., Ltd.), 1 part by weight of lecithin, 300 parts by weight of a mixed solvent of toluene, methyl ethyl ketone and methyl isobutyl ketone, and about 2 parts by weight of an organosilicone compound of the formula (A) in which each $R=C_7H_{15}$, $R_1=R_2=C_7H_{15}COO$, $R_3=CH_3$, $R_4=C_{10}H_{21}$, $k=l=m=2$, and $n=10$, were mixed in a sand mill for about 20 hours. To the resulting mixture was added about 5 parts by weight of polyisocyanate (Coronate L, Nippon Polyurethane Ind. Co., Ltd.). The resulting magnetic paint was applied onto an about 14.5 microns thick polyester film, dried and calendered in a thickness of 5.5 microns after the calendering. The thus calendered film was cured at about 60° C. for 24 hours and was then slit into a ½ inch wide magnetic tape suitable for video tape recording purposes.

EXAMPLES 2 THROUGH 6

The general procedure of Example 1 was repeated using, instead of the organosilicone compound used in example 1, an organosilicone compound of the formula (A) in which each $R=C_{11}H_{23}$, $R_1=R_2=R_3=C_{11}H_{23}COO$, $k=1$, $l=5$, $m=5$, and $n=0$, a compound of the formula (A) in which each $R=C_{17}H_{35}$, $R_1=R_2=R_3=CH_3$, $R_4=C_{16}H_{33}$, $k=3$, $l=8$, $m=25$, and $n=75$, a compound of the formula (A) in which each $R=C_{13}H_{27}$, $R_1=R_2=CH_3$, $R_3=C_{13}H_{27}COO$, $R_4=CH_3$, $k=5$, $l=2$, $m=7$, and $n=30$, a compound of the formula (A) in which each $R=C_9H_{19}$, $R_1=R_2=R_3=R_4=CH_3$, $k=1$, $l=2$, $m=2$, and $n=4$, and a compound of the formula (A) in which each $R=C_{17}H_{33}$, $R_1=R_2=R_3=C_{17}H_{33}COO$, $R_4=CH_3$, $k=2$, $l=10$, $m=15$, and $n=125$. As a result, five magnetic tapes were obtained.

COMPARATIVE EXAMPLES 1 THROUGH 4

The general procedure of Example 1 was repeated using, instead of the organosilicone compound used in Example 1, an organosilicone compound of the general formula (I) in which $R=R'=C_9H_{19}$, and $n=3$, an organosilicone compound of the general formula (II) in which $R_1=R_2=C_{13}H_{27}$, $l=5$, $m=2$, and $n=30$, an organosilicone compound of the general formula (III) in which $R=R'=C_{11}H_{23}$, $m=35$, and $n=65$, and an organosilicone compound of the general formula (IV) in which $R=C_9H_{19}$, $m=5$, and $n=5$, thereby obtaining four magnetic tapes.

The magnetic tapes obtained in Examples and Comparative Examples were subjected to the measurement of a coefficient of kinetic friction, $\mu_k$, at temperatures of 10° C., 20° C. (60% R.H.) and 40° C. (60% R.H.). Moreover, each tape was contacted with a rotary drum and the drum was rotated at a speed of 200 r.p.m. at a normal temperature to measure a coefficient of kinetic friction. From this, the abrasion resistance of each tape was determined for use as a measure for a still reproduction characteristic.

In addition, each magnetic tape was set in a video tape recorder and was repeatedly travelled 200 times under conditions of a temperature of 40° C. and a relatively humidity of 80%, after which its coefficient of kinetic friction was also measured. The results are shown in the following Table 1.

TABLE 1

|  | $\mu_k$ | | | $\mu_k$ After 200 cycles of Travelling Operation | Abrasion Resistance |
| --- | --- | --- | --- | --- | --- |
|  | 0° C. | 20° C. | 40° C. |  |  |
| Ex. 1 | 0.25 | 0.22 | 0.21 | 0.28 | Excellent |
| Ex. 2 | 0.27 | 0.21 | 0.20 | 0.28 | Excellent |
| Ex. 3 | 0.30 | 0.23 | 0.19 | 0.29 | Good |
| Ex. 4 | 0.27 | 0.22 | 0.20 | 0.30 | Excellent |
| Ex. 5 | 0.26 | 0.22 | 0.21 | 0.29 | Excellent |
| Ex. 6 | 0.29 | 0.24 | 0.22 | 0.34 | Good |
| Com. Ex. 1 | 0.26 | 0.22 | 0.20 | 0.32 | Poor |
| Com. Ex. 2 | 0.34 | 0.25 | 0.21 | 0.29 | Poor |
| Com. Ex. 3 | 0.25 | 0.22 | 0.21 | 0.45 | Moderate |
| Com. Ex. 4 | 0.35 | 0.25 | 0.23 | 0.35 | Fair |

As will be apparent from the above results, the recording tapes of the present invention are much better in abrasion resistance than the tapes of Comparative Examples. Moreover, the tapes of the present invention are better as a whole than the comparative tapes.

EXAMPLE 7

The procedure of Example 1 was repeated using 5 different amounts of the organosilicone compound used in Example 1. The resulting tapes were subjected to the measurement of the coefficient of kinetic friction. The results are shown in the sole FIGURE. As will be seen from the FIGURE, the organosilicone compound is effective in lowering the coefficient.

EXAMPLES 8 THROUGH 10

The general procedure of Example 1 was repeated using, instead of the organosilicone compound used in Example 1, an organosilicone compound of the formula (A) in which each $R=C_{13}H_{27}$, $R_1=R_2=CH_3$, $R_3=C_{13}H_{27}COO$, $R_4=CH_3$, $k=5$, $l=100$, $m=100$, and $n=100$ (Example 8), an organosilicone compound of the formula (A) in which each $R=C_{13}H_{27}$, $R_1=R_2=CH_3$, $R_3=C_{13}H_{27}COO$, $R_4=CH_3$, $k=5$, $l=180$, $m=180$, and $n=100$ (Example 9), and an organosilicone compound of the formula (A) in which each $R=C_{13}H_{27}$, $R_1=R_2=CH_3$, $R_3=C_{13}H_{27}COO$, $R_4=CH_3$, $k=5$, $l=2$, $m=7$, and $n=300$ (Example 10).

The resulting tapes were subjected to the measurement similar to the foregoing examples and the results are shown in Table 2 below.

TABLE 2

| | $\mu_k$ | | $\mu_k$ After 200 Cycles of Travelling | Abrasion |
|---|---|---|---|---|
| | 0° C. | 20° C. | 40° C. | Operation | Resistance |
| Ex. 8 | 0.29 | 0.25 | 0.24 | 0.29 | Good |
| Ex. 9 | 0.31 | 0.26 | 0.24 | 0.32 | Excellent |
| Ex. 10 | 0.28 | 0.20 | 0.19 | 0.28 | Fair |

Thus, the organosilicone compounds of the present invention are excellent as a lubricant.

What is claimed is:

1. A magnetic recording medium which comprises a support having thereon a recording magnetic layer which is made of a dispersion of magnetic particles in a mixture of a binder and a lubricant, the lubricant being an organosilicone compound of the following general formula (A)

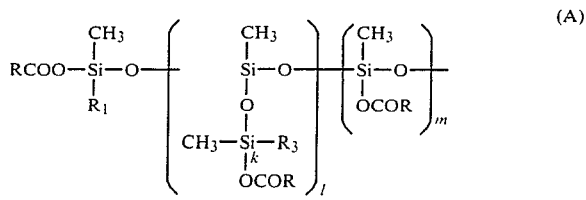

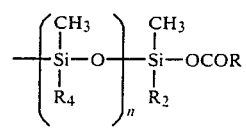

in which each R represents a saturated or unsaturated monovalent hydrocarbon group having from 7 to 21 carbon atoms, $R_1$, $R_2$ and $R_3$ independently represent a methyl or RCOO group wherein R has the same meaning as defined above, $R_4$ represents a monovalent saturated hydrocarbon group having from 1 to 20 carbon atoms, and k, l, m and n are independently an integer provided that $1 \leq k < l+m+n$, $1 \leq l \leq 200$, $1 \leq m < 200$, $0 \leq n < 300$, and $l+m+n \leq 500$.

2. A magnetic recording medium according to claim 1, wherein said organosilicone compound is contained in an amount of from 0.5 to 10 wt% of said magnetic particles.

3. A magnetic recording medium according to claim 1, wherein in the formula (A), $1 \leq l < 100$, $1 \leq m < 100$, $0 \leq n < 200$, $l+m+n \leq 300$, and $0.1 < (l+m)/n$.

4. A magnetic recording medium according to claim 1, wherein in the formula (A), each R represents $C_7H_{15}$, $R_1$, $R_2$, and $R_3$ are independently $CH_3$, and $R_4$ is $C_{10}H_{11}$.

5. A magnetic recording medium according to claim 1, wherein said medium is a video recording tape.

* * * * *